United States Patent
Johnson et al.

(10) Patent No.: US 9,680,279 B2
(45) Date of Patent: Jun. 13, 2017

(54) RUGGEDIZED FIBER OPTIC LASER FOR HIGH STRESS ENVIRONMENTS

(71) Applicant: BAE Systems Information and Electronic Systems Integration Inc., Nashua, NH (US)

(72) Inventors: Benjamin R. Johnson, Somersworth, NH (US); Michael J. Shaw, Concord, NH (US); Tyler Forbes, Mont Vernon, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/844,417

(22) Filed: Sep. 3, 2015

(65) Prior Publication Data

US 2016/0072248 A1   Mar. 10, 2016

Related U.S. Application Data

(60) Provisional application No. 62/048,579, filed on Sep. 10, 2014.

(51) Int. Cl.
| | |
|---|---|
| *G02B 6/00* | (2006.01) |
| *G02B 6/36* | (2006.01) |
| *H01S 3/04* | (2006.01) |
| *H01S 3/067* | (2006.01) |
| *G02B 6/44* | (2006.01) |
| *H01S 3/23* | (2006.01) |
| *H01S 3/094* | (2006.01) |
| *H01S 3/0941* | (2006.01) |
| *H01S 3/042* | (2006.01) |

(52) U.S. Cl.
CPC .......... *H01S 3/0407* (2013.01); *G02B 6/4457* (2013.01); *H01S 3/06704* (2013.01); *H01S 3/042* (2013.01); *H01S 3/0675* (2013.01); *H01S 3/09415* (2013.01); *H01S 3/094003* (2013.01); *H01S 3/23* (2013.01)

(58) Field of Classification Search
CPC ... G02B 6/4457; G02B 6/4458; H01S 3/0407; H01S 3/06704; H01S 3/0675; H01S 3/06716; H01S 3/067
USPC .................. 385/76, 100, 120, 135, 137, 142
See application file for complete search history.

(56) References Cited

U.S. PATENT DOCUMENTS

| | | | | |
|---|---|---|---|---|
| 3,962,655 | A * | 6/1976 | Selway ................. | H01S 5/4025 257/719 |
| 8,167,504 | B2 * | 5/2012 | Allen ................... | G02B 6/4475 385/100 |
| 9,090,315 | B1 * | 7/2015 | Stone ................... | G02B 6/3604 |
| 2004/0182732 | A1 | 9/2004 | Zamel et al. | |

(Continued)

*Primary Examiner* — Kaveh C Kianni
*Assistant Examiner* — Hung Lam
(74) *Attorney, Agent, or Firm* — Hayes Soloway PC; Scott J. Asmus

(57) ABSTRACT

A fiber optic laser for use in high stress environments is provided. The fiber optic laser comprises a hollow spool structure housing a fiber in a spiral groove in an interior surface of said hollow spool structure, wherein the fiber is mechanically supported along an entirety of its length within the hollow spool structure. Fluid channels are formed within the hollow spool structure, wherein a quantity of coolant is movable through the fluid channels to provide high-precision thermal management of the fiber.

15 Claims, 13 Drawing Sheets

(56) References Cited

U.S. PATENT DOCUMENTS

2008/0037604 A1* 2/2008 Savage-Leuchs .... G02B 6/4296
372/44.01
2010/0215326 A1* 8/2010 Zediker .................... E21B 7/14
385/100
2013/0235449 A1* 9/2013 Suzuki .................. H01S 3/0405
359/341.1

* cited by examiner

RUGGEDIZED FIBER OPTIC LASER FOR HIGH STRESS ENVIRONMENTS

CROSS REFERENCE TO RELATED APPLICATIONS

This Application claims rights under 35 USC §119(e) from U.S. Provisional Patent Application Ser. No. 62/048,579 filed Sep. 10, 2014, the contents of which are incorporated herein by reference.

FIELD OF THE INVENTION

This invention relates to fiber optic lasers, and more particularly, to the methods and apparatus for improving robustness of fibers of such fiber-optic lasers.

BACKGROUND OF THE INVENTION

Fiber optic lasers continue to proliferate throughout a significant number of places in the world including but not limited to deep sea installations, on board high speed aircraft, and interstellar spacecraft. As the applications become more and more demanding, these fiber lasers are required to withstand significantly harsher environments, including extreme temperatures and intense vibrations on rotary wing military aircraft. Designing these fiber lasers to withstand these environments ensures guaranteed reliable performance.

The current practice of packaging fiber optics includes housing the active fibers of the fiber laser on the outside of spools and connecting these active fibers to passive fibers in passive service loops. The passive service loops often contain fiber from many different parts of a laser and contain varying intensities of light, which are generally different wavelengths. Regardless of failures in the active doped fiber, a failure in a single service loop may compromise or destroy other parts of the fiber laser and can result in catastrophic laser failure due to the spatial intimacy of those fibers. More importantly, failures occur not only due to mechanical breakage from vibration or pinching of the optical fibers, but also from thermal stress due to the large amounts of heat generated in the active fibers. For instance, the presence of kinks or sharp radiuses in the active fibers can create hotspots which are subject to failure, especially in high power laser operation. Moreover, since passive fibers are connected to the active fibers at a splice, any discontinuities at the splice create a source of heat. Additionally, fiber Bragg gratings are typically located at either end of the active doped fiber and these too must be temperature controlled. The result of not dissipating the heat at these hotspots is failure.

By way of further background, fiber transitions from one portion of a fiber laser to another are often left free-floating, e.g., without making contact with a mounting surface. This free-floating fiber is vulnerable to high loads and strenuous vibration modes due to the suspended nature of the fiber. Common strain/stress reliefs using external flexible boots ease the transition from a component to a stabilizing surface, but these devices do not eliminate the potential for failure at that interface. Often times, strain reliefs are clamped down so hard that they squeeze the core of the optical fiber which alters the light transmission through these fibers.

Fiber optic lasers usually involve packaging a symmetrical cylindrical package such as a spool adapted to carry a length of doped active fiber wound around the barrel of the spool. Optical energy is injected into the active fiber which, in-turn, produces the desired laser output. Typically the optical fibers for such lasers are relatively long, generally on the order of between ¼ m and 10 m in length depending on the dopants utilized. In terms of providing sufficient mechanical support for the fiber and in terms of thermal management, such long lengths of fiber may present issues when the fiber lasers are packaged in compact units. If a spool is used to house the fibers, a few meters of active fiber may typically require, in one example, seven turns on the spool. Typically, for spool-mounted optical fiber, there are terminations at either end of the active doped fiber which are subject to failure. These terminations may utilize various rare earth elements, such as thulium, holmium, ytterbium, erbium, and other rare earth elements, to dope the glass fibers. It is at these terminations that passive fibers or fiber Bragg gratings are connected. As mentioned above, these failures can be both mechanical and thermal failures.

With respect to high output power, and more particularly with respect to the utilization of these lasers in directed energy applications, it is important to be able to combine the output of the lasers to produce a combined output beam that can exceed 1000 W. It may, therefore, be necessary to combine the fiber laser outputs of, for instance, a number of 100 Watt lasers to obtain the full output power. Additionally, if modulators or other apparatus at the ends of or along the fiber optic lengths are used, the mechanical and thermal aspects of connecting these units to the fibers should be controlled. The wiring in proximity to the fibers must also be controlled, such that the wiring does not touch the fibers or apply abrasive forces to them in any way when the unit experiences vibrations and other environmental factors.

Conventional fiber packaging strategies utilize plastic fiber-routing clips and other hardware which are not adequate for high-stress embodiments, such as those involving military vehicles under extended periods of operation. These conventional fiber routing components are too flexible, they do not retain the fiber in place adequately, they cannot withstand extreme temperatures and vibration, and they are often designed too generically to satisfy intensive size, weight and power (SWaP) demands. Typical conventional fiber-routing hardware and strategies require significant modification to survive demanding environments.

Furthermore, in conventional low-power fiber laser systems, there is no thermal management, even though the thermal characteristics of laser systems affect their performance. The major heat generating sources are the laser diodes and the doped fibers themselves. Thus, in high power fiber optic laser applications, there is a considerable amount of heat generated within the fiber itself or at the connections to the fiber that must be dissipated. Conventional packaging techniques often utilize concentric packaging techniques in which various sections of the active fibers are coiled, one inside the other, in a concentric fashion. However, in such concentric packaging applications, there are heat-generating elements. When fiber optic coils are stacked inside one another in a radial stacking pattern, there is insufficient thermal management.

Thus, a heretofore unaddressed need exists in the industry to address the aforementioned deficiencies and inadequacies.

SUMMARY OF THE INVENTION

Embodiments of the present disclosure provide a system and method for a fiber optic laser. Briefly described, in architecture, one embodiment of the system, among others, can be implemented as follows. The fiber optic laser includes a hollow spool structure housing a fiber in a spiral groove in an interior surface of said hollow spool structure, wherein the fiber is mechanically supported along an entirety of its length within the hollow spool structure. Fluid channels are formed within the hollow spool structure, wherein a quantity of coolant is movable through the fluid channels to provide high-precision thermal management of the fiber.

The present disclosure can also be viewed as providing a fiber optic laser assembly. Briefly described, in architecture, one embodiment of the system, among others, can be implemented as follows. A plurality of stacked spool lasers is provided, wherein each of the stacked spools has a hollow spool core. A grooved spiral structure is formed on an inner surface of the hollow spool core of each of the plurality of stacked spool lasers. An active doped fiber is positioned at least partially within the grooved structure, wherein the active doped fiber is continuously supported within the fiber optic laser assembly.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
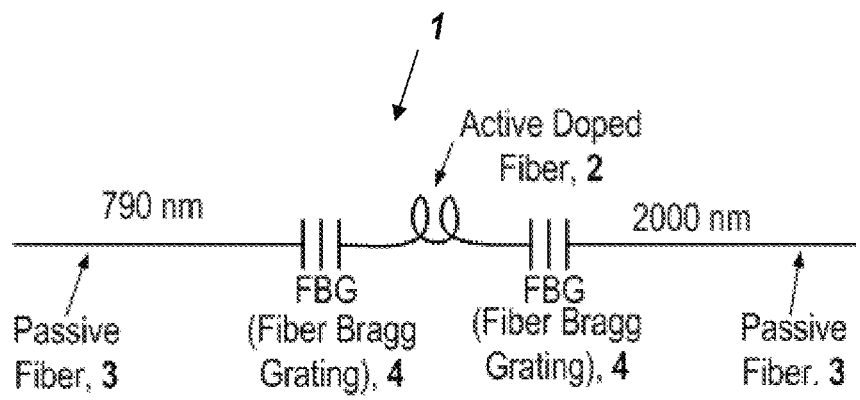
FIG. 1 is a diagrammatic illustration of an optical fiber laser showing an active doped fiber, passive fibers and fiber Bragg gratings, in accordance with a first exemplary embodiment of the present disclosure.

The subject disclosure is directed to a fiber optic laser system which provides solutions to the thermal management issues and the mechanical support issues that conventional fiber-based laser systems fail to address. In doing so, the subject disclosure allows high-powered fiber optic-based laser systems, capable of providing the necessary outputs, to be packaged in commercially-viable sizes. In one aspect, the subject disclosure isolates fiber from various components of a fiber laser and prevents them from detrimentally interacting and potentially causing failures. An encapsulated active doped fiber may be coiled along the interior surface of a hollow spool core that has precise spiral grooves in its internal surface. The spool has an integral spool body which is cooled, in one embodiment, with axial fluid passages surrounding the spool. A specialized strain relief and splice assembly permits clamping of the fibers to the spool body and also aligns the passive fiber to the spool with the active fiber in the spool without crimping or applying undue pressure on the optical fiber core. In one embodiment, spools are stacked one on top of the other to provide a stacked spool assembly in which a number of fiber optic lasers can be housed in one assembly, and in which the outputs of the lasers can be conveniently combined.

The subject laser uses environmentally robust interfaces which increase the environmental robustness and lower installation and integration costs by allowing minimally skilled technicians to install it. The robustness stems from a tailored mechanical spool structure in which each of the spools and associated assemblies continuously both mechanically support and thermally manage the optical fibers throughout the length of the optical fibers. Thus, physical support and thermal management is provided throughout the entire length of the optical fibers. In one embodiment, the spool is provided with a hollow spool core, with the spooled active fibers carried in spiraled machined precision grooves in an interior surface of the hollow core, rather than being wrapped around a spool body. This design permits heat removal from the active fibers carried by the core out through the spool body. The spool body is provided, in one embodiment, with axial channels adjacent the spiraled grooves in the spool, with these axial channels providing cooling fluid to provide thermal regulation of the entire active doped fiber along its entire length.

Moreover, the specialized strain relief and splicing apparatus not only prevents kinking and crimping of the optical fibers, but the use of thermally conductive clamps over these devices removes heat, thereby relieving hotspots. Additionally, a thermal heating and cooling apparatus is provided adjacent the fiber Bragg gratings used at the ends of the active doped fiber to control the temperature at which the fiber optic laser operates. This design may permit tuning the fiber optic laser output to specific wavelengths.

The subject spool structure provides high precision internal spool thermal management, and enables high-density packaging by exploiting a single thermal interface created by stacking the spools in a stacked assembly. In a preferred embodiment, after the fibers are fed into the precision grooves, these grooves are filled with thermally conductive encapsulant which serves not only to secure the fibers to their respective grooves but also assists in the thermal transfer of heat from the fiber through the spool body to the coolant in the coolant channels. The encapsulation is dually employed to protect the fiber from fatigue and damage from vibration as well as for heat transfer purposes. Moreover, the recessed spool body flats can be used with sections of optical fiber to permit secure clamping for splicing. This fiber connection support structure may permit direct transitioning of fiber from one component to another within the laser with continuous, secure, and non-pitching support.

In a military environment, the laser system may be composed of a fiber-coupled pump diode, a fiber-coupled oscillator/amplifier module in the form of the spooled and doped glass fibers, and a fiber-coupled beam director designated for use on an aircraft. The pump diode and electronics may be packaged at the rear of the aircraft, with the fiber module being positioned in the center of the aircraft and with the beam director at the front. The present invention enables a significantly higher-power class laser to be installed in military vehicles in this manner, and provides a path to high rate production of high power fiber lasers intended for use in strenuous environments.

It will be appreciated that the subject fiber optic laser provides significant improvements over conventional lasers that are constructed with an entanglement of fiber, where the entanglement of fibers is known in the industry to significantly reduce reliability. The present invention structures the fiber laser such that fiber failures due to mechanical perturbations and thermal cycling, as well as poor fiber couplings, are significantly reduced, if not eliminated. The present invention is described in detail relative to the figures of this disclosure.

FIG. 1 is a diagrammatic illustration of an optical fiber laser showing an active doped fiber, passive fibers and fiber Bragg gratings, in accordance with a first exemplary embodiment of the present disclosure. A fiber optic laser 1 generally includes a coiled active doped fiber 2 to which passive optical fibers 3 are coupled. Fiber Bragg gratings 4 are positioned between the terminating ends of the active doped fiber 2 and the passive optical fibers 3. In one example, the input to the fiber optic laser 1 is from a 790 nm diode pumped laser source. The wavelength of the diode pumped laser source is converted to an output at 2000 nm, due to the lazing action in the active glass fiber.

Figure 2:
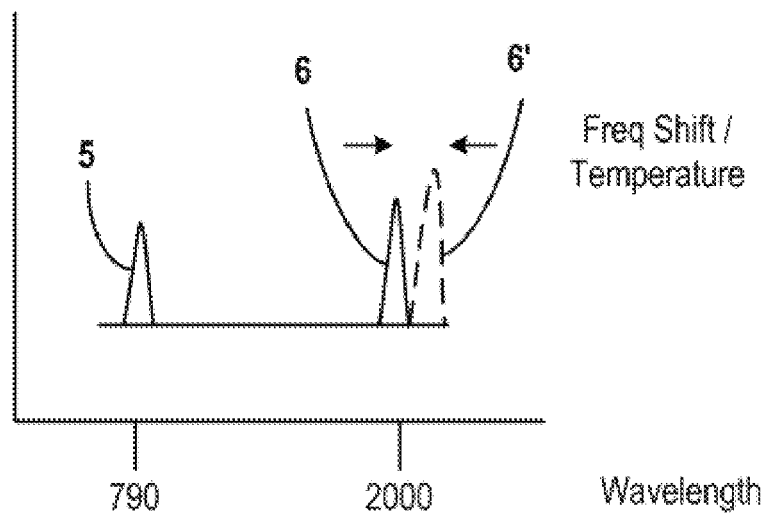
FIG. 2 is a graph showing the frequency response at the input and output of the optical fiber laser FIG. 1, in accordance with the first exemplary embodiment of the present disclosure.

In general, the operating wavelength of the fiber optic laser 1 of FIG. 1 is temperature sensitive, such as illustrated in FIG. 2, which is a graph showing the frequency response at the input and output of the optical fiber laser of FIG. 1, in accordance with the first exemplary embodiment of the present disclosure. Here, an input 5 having a 790 nm wavelength may result in a spectral line output 6 displaced from its original position to a spectral line that is shifted, as shown in dotted outline 6'. This shift between the output 6 to output 6' is due to temperature variations, which themselves are largely due to the heat generated in the active doped optical fiber. The output wavelength is oftentimes critical when the optical fiber laser is coupled to downstream laser amplifiers or oscillators which, due to the narrow bandwidth of these devices require precise pumping.

It is, therefore, important that optical fiber lasers have a stable and controllable spectral output frequency or wavelength so that they may be used as designed. In order to do so, the temperature of the active doped fibers, as well as the rest of the elements in the laser, must be carefully controlled. This need for temperature control becomes relatively difficult if the laser design produces hotspots, either from the heat generated by the active doped optical fiber or other components of the laser.

Figure 3:
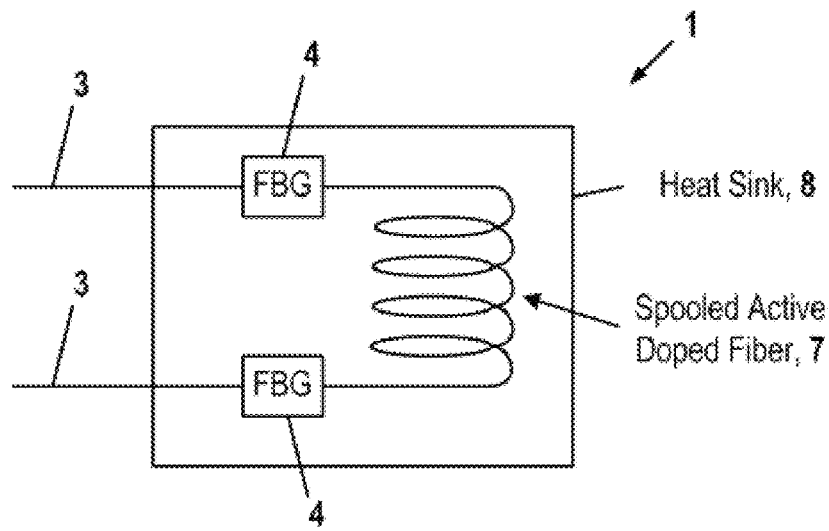
FIG. 3 is a diagrammatic illustration of the optical fiber laser of FIG. 1 illustrating a spooled active doped fiber and the utilization of fiber Bragg gratings at either end thereof, in accordance with the first exemplary embodiment of the present disclosure.

FIG. 3 is a diagrammatic illustration of the optical fiber laser of FIG. 1 illustrating a spooled active doped fiber and the utilization of fiber Bragg gratings at either end thereof, in accordance with the first exemplary embodiment of the present disclosure. As is shown, a fiber optic laser 1 has a spooled active doped fiber 7 which may be placed in a housing that functions as a heat sink 8. The purpose of the heat sink 8 may be to absorb hotspots generated by the spooled active doped fiber 7 and other hotspots associated with the fiber Bragg gratings 4 that terminate the ends of the optical fibers 3.

Figure 4:
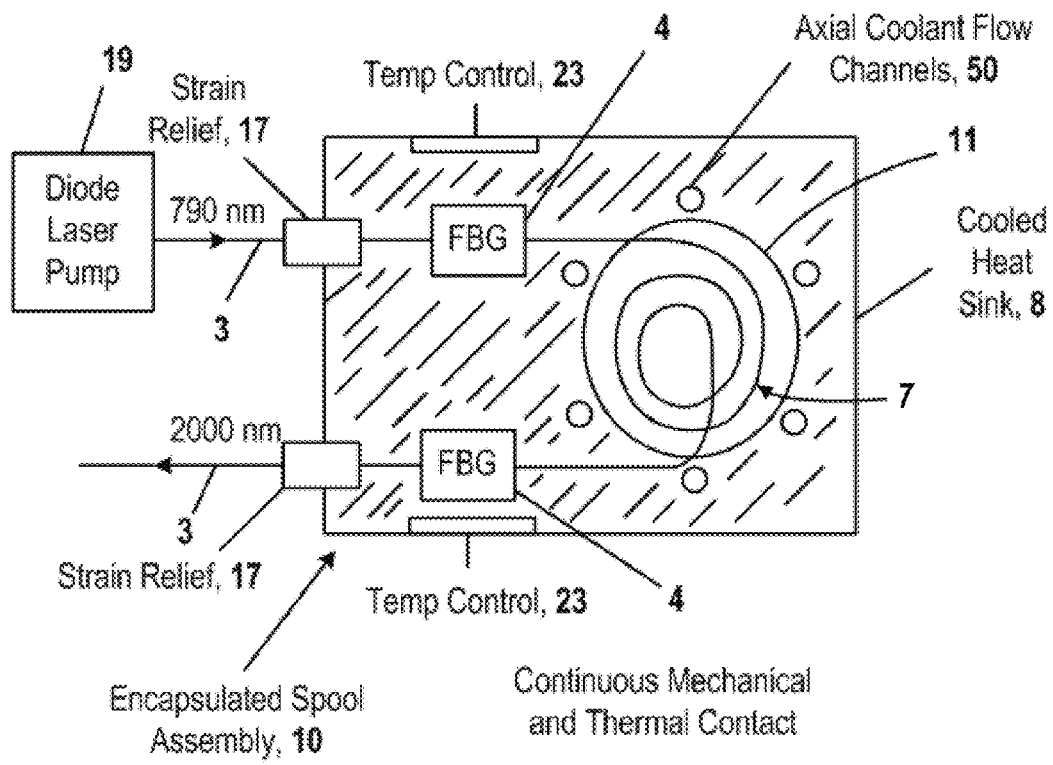
FIG. 4 is a diagrammatic illustration of one embodiment of the subject invention in which a spool body is provided with an internally grooved structure to house a spiraled active doped fiber, illustrating axial active coolant flow channels surrounding the spooled active fiber, as well as showing various hotspot control assemblies, in accordance with the first exemplary embodiment of the present disclosure.

FIG. 4 is a diagrammatic illustration of one embodiment of the subject invention in which a spool body is provided with an internally grooved structure to house a spiraled active doped fiber, illustrating axial active coolant flow channels surrounding the spooled active fiber, as well as showing various hotspot control assemblies, in accordance with the first exemplary embodiment of the present disclosure. As can be seen, in one embodiment, thermal control and mechanical stability may be achieved by locating the spooled active optical fiber 7 within a grooved, hollow spool core 11, with the active fiber as well as the fiber Bragg gratings 4 using the spool body of the grooved, hollow spool core 11 as a heat sink 8. Strain relief assemblies 17 may be utilized to secure passive fibers 3 to cooled heat sink 8 at both an input and output of the encapsulated spool assembly 10. As is common, a diode laser pump 19 may be used to pump the fiber optic laser at 790 nm, or another wavelength, as may be determined by the design of the fiber laser.

One of the sources for thermal hotspots is the fiber Bragg gratings 4. These devices are heat sources whose heat must be dissipated, in some instances, to control the operating frequency of the laser. Cooling the fiber Bragg gratings 4 can be used to shift the output spectrum of the laser in one direction, as discussed relative to FIG. 2, whereas the spectral lines may be shifted by heating the fiber Bragg gratings 4 to move the spectral line in an opposite direction. In order to perform this function, temperature control assemblies 23 are placed in the vicinity of the fiber Bragg gratings and are used to control the temperature thereof to provide adjustment of the spectral output of the laser. As will be discussed hereinafter, axial coolant flow channels 50 positioned parallel to the axis of the spool may be included, through which coolant fluid is passed to carry heat generated by the active optical fiber away from the spool.

Figure 5:
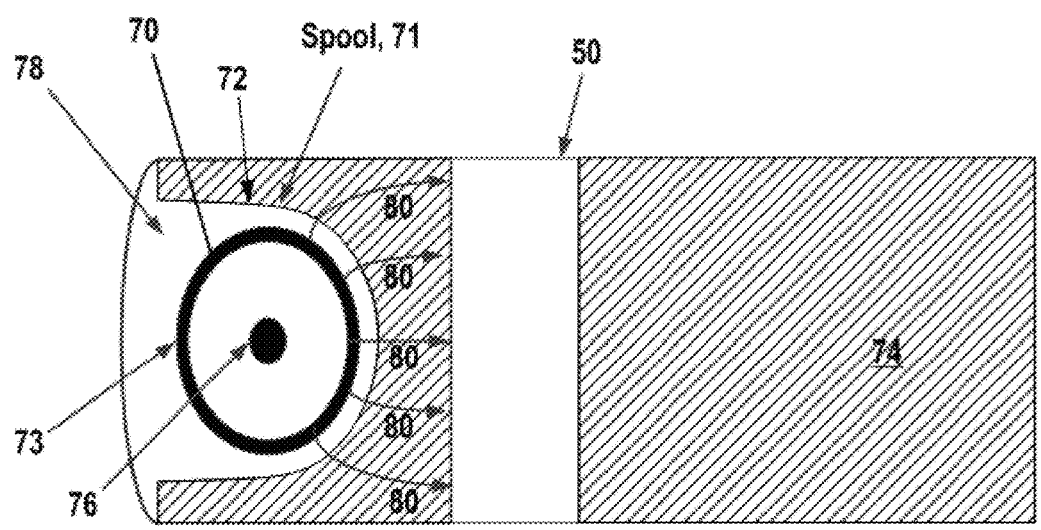
FIG. 5 is a diagrammatic illustration of the placement of an optical fiber in a spool groove adjacent an axial coolant channel in the spool body, illustrating conductive heat flow from fiber to the coolant channel, also illustrating a thermally conductive encapsulant, in accordance with the first exemplary embodiment of the present disclosure.

FIG. 5 is a diagrammatic illustration of the placement of an optical fiber in a spool groove adjacent an axial coolant channel in the spool body, illustrating conductive heat flow from fiber to the coolant channel, also illustrating a thermally conductive encapsulant, in accordance with the first exemplary embodiment of the present disclosure. As shown, an optical fiber 70 is housed within a mandrel channel or groove 72 within a hollow spool core 71 that is part of spool body. Optical fiber 70 includes fiber optic cladding 73 and a fiber optic core 76, as illustrated. In the illustrated embodiment, groove 72 is filled with a thermally conductive encapsulant 78 which assures that heat generated in the doped optical fiber flows as illustrated by arrows' 80 to coolant channel 50, in which the coolant flows axially adjacent the fibers. One type of encapsulant 78 may include silicone.

Figure 6A:
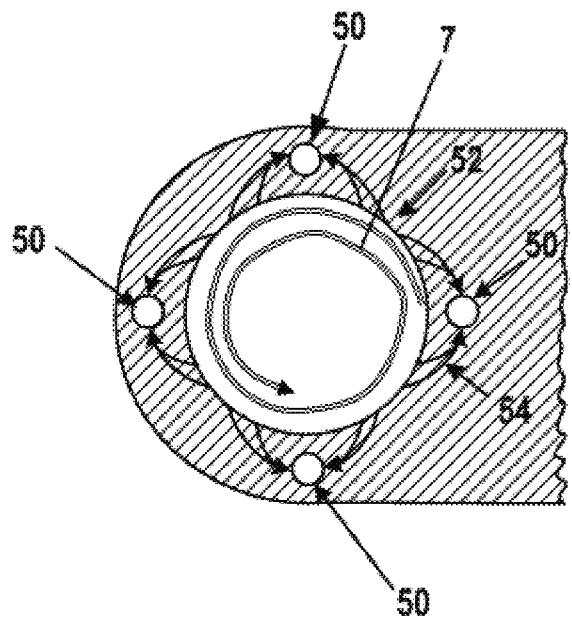
FIG. 6A is a diagrammatic illustration of the transfer of heat from a spiraled active doped fiber carried within a hollow spool core having coolant channels surrounding the periphery of the core, in accordance with the first exemplary embodiment of the present disclosure.

FIG. 6A is a diagrammatic illustration of the transfer of heat from a spiraled active doped fiber carried within a hollow spool core having coolant channels surrounding the periphery of the core, in accordance with the first exemplary embodiment of the present disclosure. The optical fiber 7 is shown coiled within grooved hollow spool core 52. From a conceptual point of view, the aforementioned axial channels 50 may be routed adjacent precision grooves in the interior surface of hollow spool core 52, with the primary heat transfer path illustrated by arrows 54, in which heat is transferred from spooled optical fiber 70. This thermal flow may constitute an active coolant flow system involving conduits 50 that convey coolant fluid adjacent the optical fibers as illustrated, such that heat is transferred from the doped optical fibers to the coolant fluid.

Figure 6B:
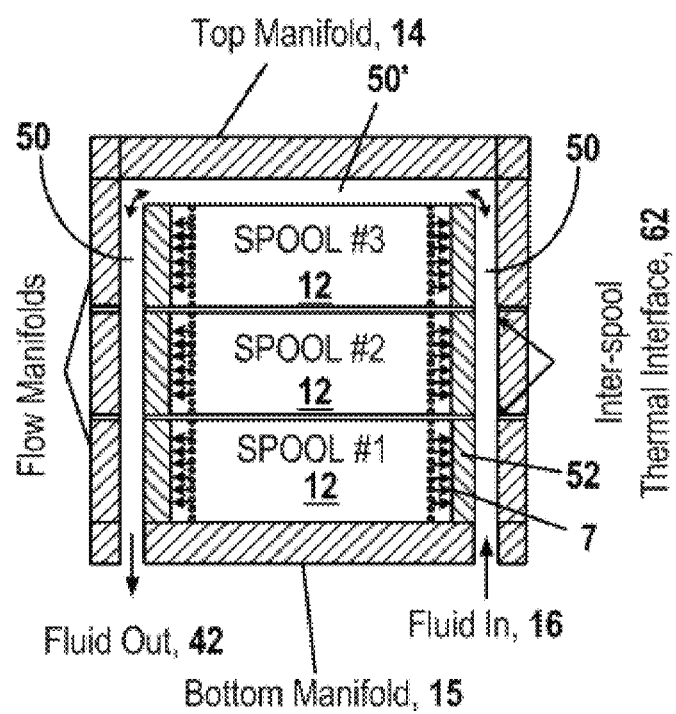
FIG. 6B is a diagrammatic illustration in cross-section of the stacking of spools within a stacked spool assembly having top and bottom manifolds, axial cooling channels, and also illustrating the transfer of heat from the spooled fibers through the spool body to the coolant flow channels, in accordance with the first exemplary embodiment of the present disclosure.

FIG. 6B is a diagrammatic illustration in cross-section of the stacking of spools within a stacked spool assembly having top and bottom manifolds, axial cooling channels, and also illustrating the transfer of heat from the spooled fibers through the spool body to the coolant flow channels, in accordance with the first exemplary embodiment of the present disclosure. As shown, a number of spools 12 are stacked one on top of the other with the associated active fibers 7 transferring heat to adjacent walls of the hollow spool core 52. Here, it can be seen that a common axial passage 50 conveys input fluid through the associated channel 50 across a top channel 50' and down the other side to convey the heated fluid out, as illustrated. The stacked spool arrangement is made possible through the utilization of the bottom manifold 15 that sandwiches the spools between bottom manifold 15 and a top manifold 14. The inter-spool thermal interfaces 62, shown here, in one embodiment, thermally separate and isolate the spools to prevent thermal crosstalk.

Figure 7:
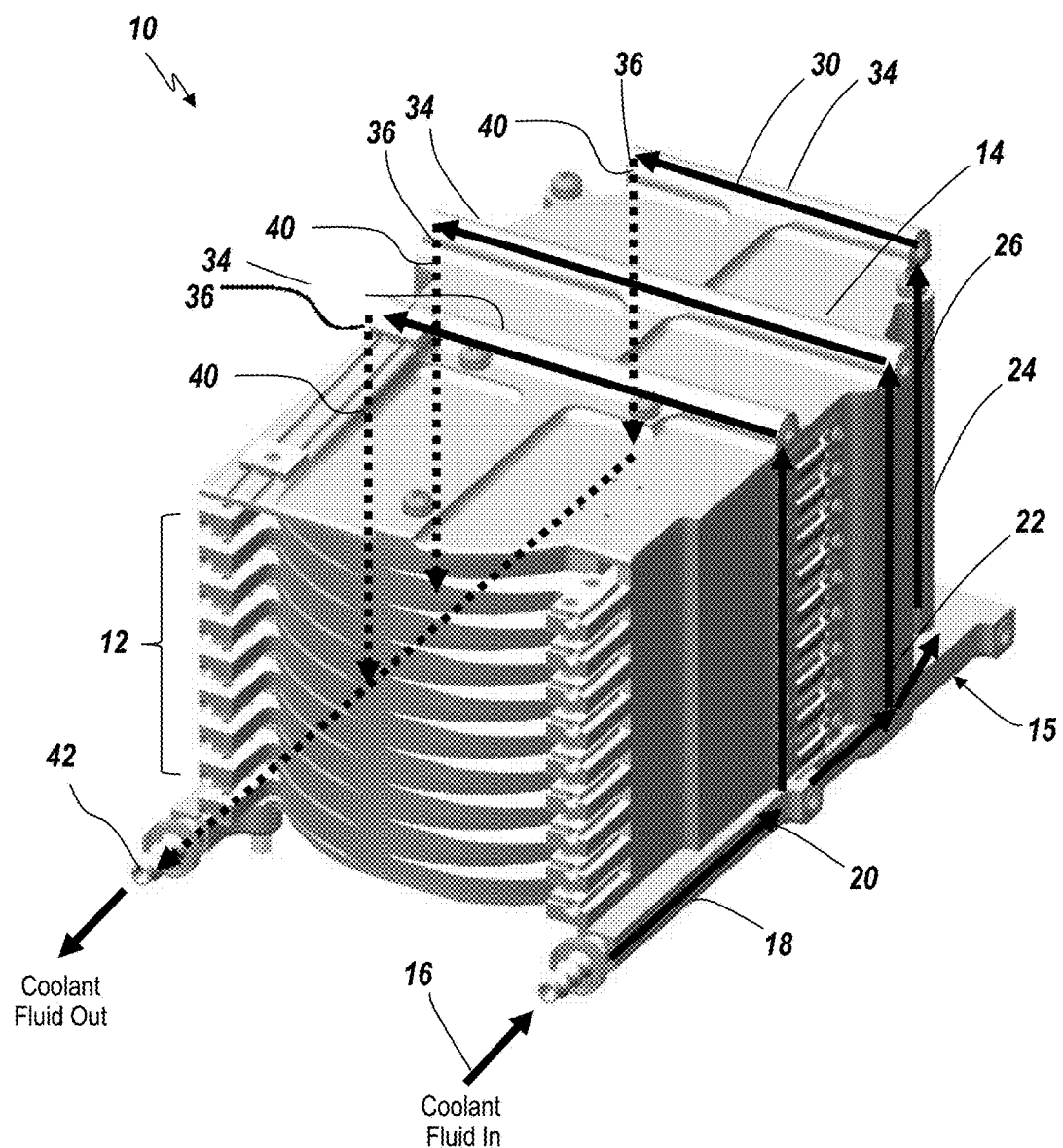
FIG. 7 is a perspective view of a compact fiber laser having stacked spools in a sealed enclosure carrying optical fibers in which a coolant distribution manifold structure includes a number of axial coolant channels utilized to remove heat from the doped optical fibers as well as other heat generating components within the spool structure, in accordance with the first exemplary embodiment of the present disclosure.

The structure illustrated in FIG. GB is a specialized mechanical structure in which a number of spools may be stacked one on top of the other and on a bottom manifold, with the structure being sealed by a top manifold. An example of how this structure is accomplished is illustrated in FIG. 7, which is a perspective view of a compact fiber laser having stacked spools in a sealed enclosure carrying optical fibers in which a coolant distribution manifold structure includes a number of axial coolant channels utilized to remove heat from the doped optical fibers as well as other heat generating components within the spool structure, in accordance with the first exemplary embodiment of the present disclosure. As shown in FIG. 7, a specialized mechanical structure, or sealed stacked spool structure 10, may be used to encase a fiber laser to protect it in high stress environments.

The sealed stacked spool structure 10 may have a number of enclosed fiber laser spool assemblies 12 which house lengths of optical fibers wound into grooves in a grooved hollow spool core. It will be appreciated that the length of the fiber may be a fraction of a meter to 10 meters in length, or another length. The stacked structure includes top and bottom coolant distribution manifolds 14, 15, in which coolant is introduced through an inlet 16 and into a horizontal manifold channel 18 in the bottom manifold 15. The horizontal manifold channel 18 communicates with axial channels 20, 22, 24 to move the coolant fluid axially, as illustrated by arrows 26 upwardly through the stacked fiber laser spool structure. When the coolant reaches the top manifold cover 14, the cooling fluid is transported horizontally, as illustrated by arrows 30, across the top of the structure 10 in top cross spool channels 34 that communicate with opposed axial channels 36. Thereafter, coolant fluid moves downwardly, as illustrated at arrows 40, in corresponding axial channels where the coolant fluid 42 exits the manifold structure at output 42, as illustrated.

As can be seen, the sealed stacked spool structure 10 uses a sealed enclosure having active cooling which employs stacked spools carrying active doped optical fibers, and includes one or more mechanical interfaces for structural fastening and/or support, one or more common thermal interfaces, and one or more optical interfaces in the form of input/output windows or optical fibers. The sealed stacked spool structure 10 reinforces the fiber to prevent abrasion of fiber in high-stress environments and provides active cooling for thermal management. The sealed stacked spool structure 10 may be designed so that multiple lasers may be combined, or stacked such that mechanical interfaces are shared for space-efficient packaging.

Figure 8:
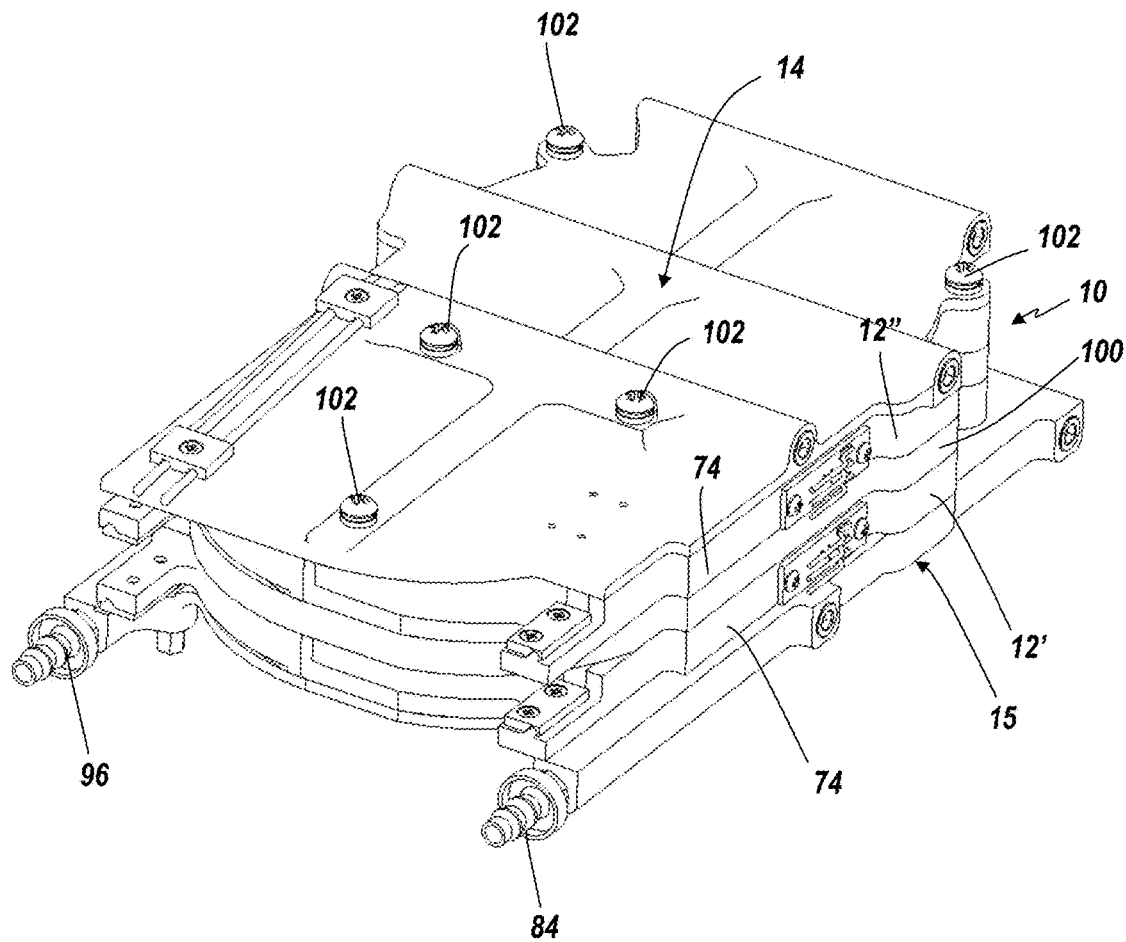
FIG. 8 is a perspective view of stacked spools and associated manifold structure showing the spools spaced apart by heat spreaders, in accordance with the first exemplary embodiment of the present disclosure.

FIG. 8 is a perspective view of stacked spools and associated manifold structure showing the spools spaced apart by heat spreaders, in accordance with the first exemplary embodiment of the present disclosure. As illustrated, a sealed, two spool structure 10 includes spool assemblies 12', 12". Spool assembly 12' is located on top of bottom manifold 15 and spaced apart by spreader 100 from spool assembly 12". In one embodiment, the spreader 100 is used for thermal isolation between spools, but other structures and/or designs may also be used. For example, in another embodiment, the spreader 100 may be utilized for thermal conduction between the spools, such as may be desired in a two spool equal power application with limited coolant flow. In such a condition, it may be beneficial to take advantage of convection to the ambient environment. Thus, in some instances it may be desirable to increase thermal coupling between spools.

As is also shown in FIG. 8, the stacked spools 12', 12" may be bolted together by bolts 102 to provide a ruggedized sealed unitary stacked spool structure 10 in which the bottom manifold 15 has an input port 84 and output port 96. The number of spools within the stack may vary, depending on the design of the structure 10 and depending on the operational requirements of the device.

Figure 9:
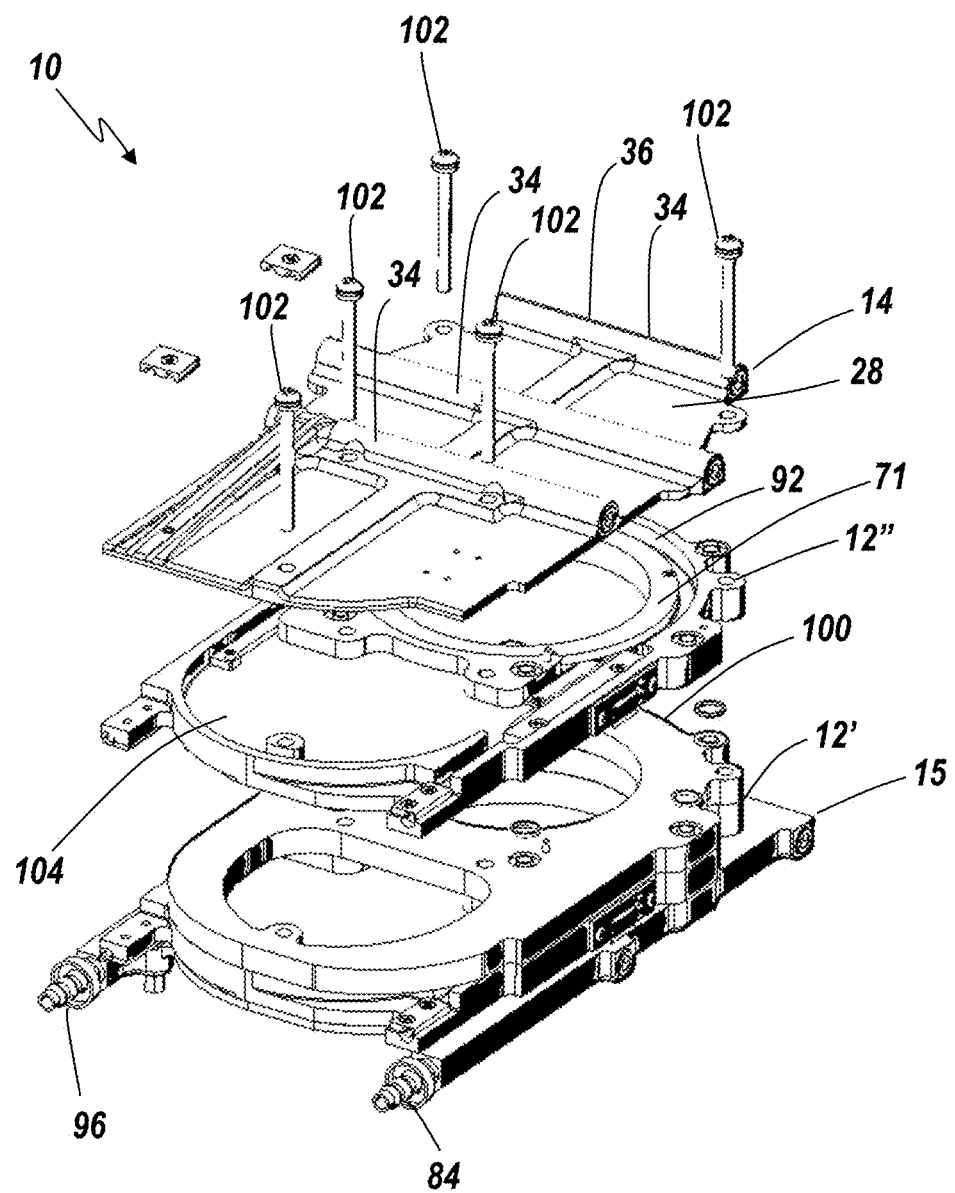
FIG. 9 is an exploded view of the spool structure of FIG. 8 illustrating the spool and top and bottom manifolds, also illustrating a heat spreader between spools, in accordance with the first exemplary embodiment of the present disclosure.

FIG. 9 is an exploded view of the spool structure of FIG. 8 illustrating the spool and top and bottom manifolds, also illustrating a heat spreader between spools, in accordance with the first exemplary embodiment of the present disclosure. Relative to FIGS. 8-9, the bottom manifold 15 may support the first spool assembly 12' with the spreader 100 placed on top. The second spool assembly 12" may be positioned atop spreader 100 and a circumferential channel 92 may be used to route a passive input fiber in an oval around the periphery of the spool body where it meets the input end of the spooled active fiber. The active fiber may extend in the grooves in the grooved hollow spool core. The manifold top plate 14 may have cross manifold channels which are placed on top of the stacked spools, with bolts 102 securing the stacked spool and manifold structure together.

Figure 10:
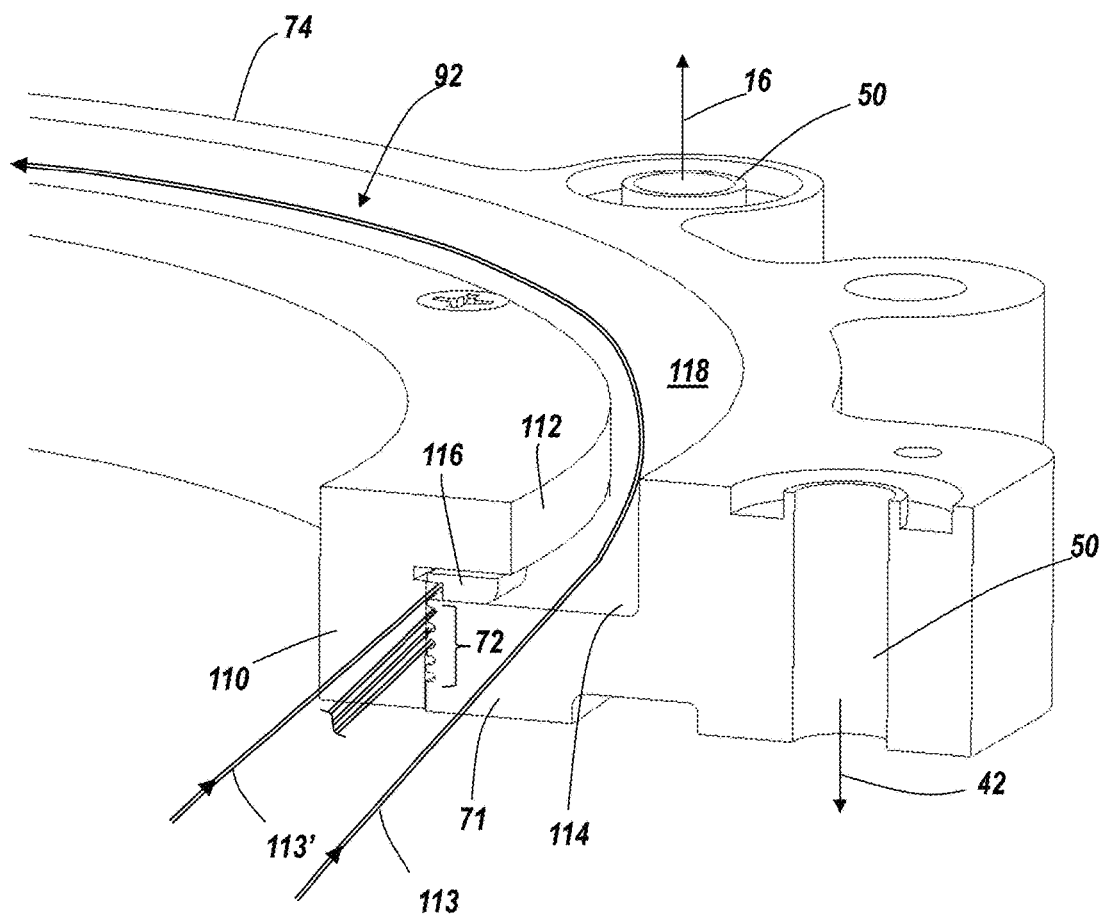
FIG. 10 is a diagrammatic illustration of a portion in cross-section of the spools of FIGS. 5-9, illustrating fiber carrying grooves within the spool, also illustrating axial coolant channels and a circumferential channel adjacent the spool, in accordance with the first exemplary embodiment of the present disclosure.

FIG. 10 is a diagrammatic illustration of a portion in cross-section of the spools of FIGS. 5-9, illustrating fiber carrying grooves within the spool, also illustrating axial coolant channels and a circumferential channel adjacent the spool, in accordance with the first exemplary embodiment of the present disclosure. As is shown in FIG. 10, a portion of spool body 74 is depicted in which fiber receiving grooves 72 in grooved hollow spool core 71 contain fibers which are wedged against a retaining ring 110. Here, a spool flange 112 is located above circumferential channel 92 in spool body 74, with a splice clamp 116 positioned between spool flange 112 and the bottom 118 of channel 92. A passive fiber cable 113 is routed around the spool and around an elliptical path in the spool body. The distal end of passive cable 113 here shown at 113' is coupled in a specialized splice 116 and clamping structure to an active doped fiber, where the fiber cable 113' terminates, as is described further relative to FIG. 14. Also shown are axial coolant fluid channels 50 through spool body 74 adjacent the periphery of channel 92, with coolant fluid input illustrated by arrow 16 moving upwardly in the associated channel and with coolant fluid out indicated by arrow 42 in the associated axial channel 50.

Figure 11:
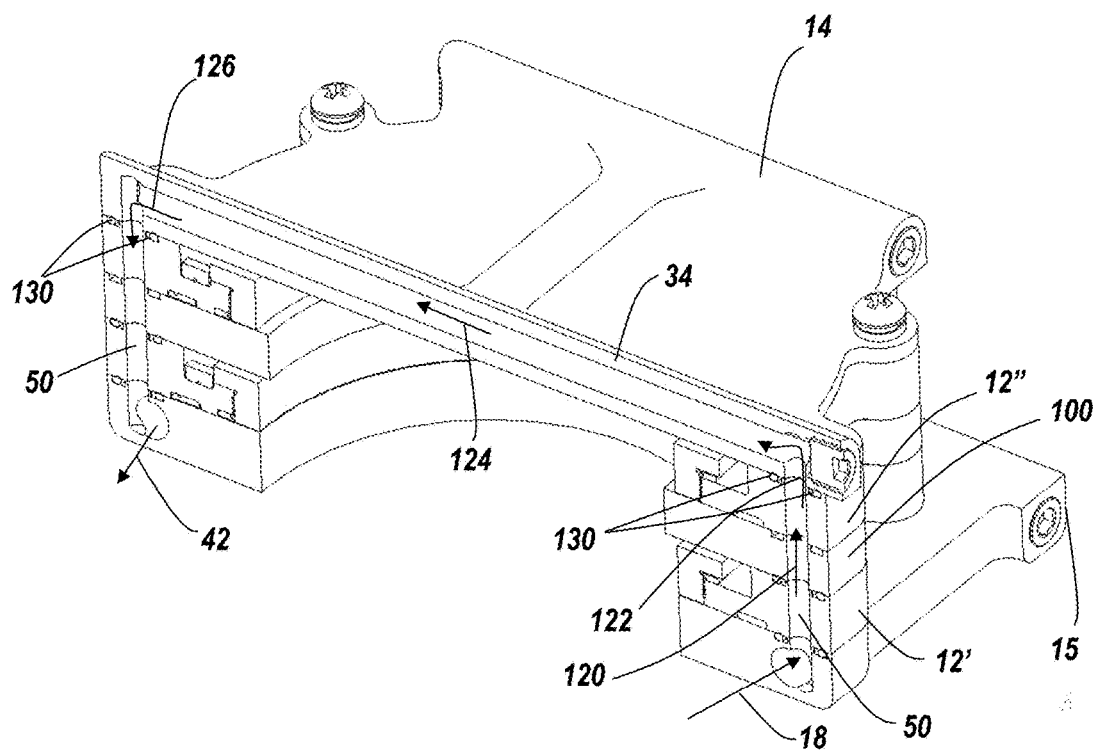
FIG. 11 is a perspective and cross-sectional view of the spools of FIGS. 5-9, showing the stacked spool structure including axial coolant channels and a top horizontal cross spool coolant channel in a manifold cover, in which the horizontal cross spool channel communicates between opposed axial channels, also showing the spreaders shown in FIGS. 8 and 9, in accordance with the first exemplary embodiment of the present disclosure.

FIG. 11 is a perspective and cross-sectional view of the spools of FIGS. 5-9, showing the stacked spool structure including axial coolant channels and a top horizontal cross spool coolant channel in a manifold cover, in which the horizontal cross spool channel communicates between opposed axial channels, also showing the spreaders shown in FIGS. 8 and 9, in accordance with the first exemplary embodiment of the present disclosure. Spool assemblies 12' and 12" along with their associated spool bodies are shown to either side of spreader 100. Here, it can be seen that coolant-in, as illustrated by arrow 18, travels upwardly through coolant channel 50, as illustrated by arrow 120, where it traverses top cross spool channel 34, as illustrated by arrows 122 and 124, and exits through axial coolant channel 50, as illustrated by arrow 126, such that it exits the bottom manifold section 15, as illustrated by arrow 42. The various sections of the stacked spool structure are gasketed, such as with O-rings 130, for example, to seal the structure. While a single flow direction is shown in FIG. 11, it will be appreciated that fluid may be introduced at two points at the bottom manifold, with the resulting fluid exiting out of an aperture (not shown) in the top cross spool channel 34 to prevent thermal gradients across the stacked structure.

Figure 12:
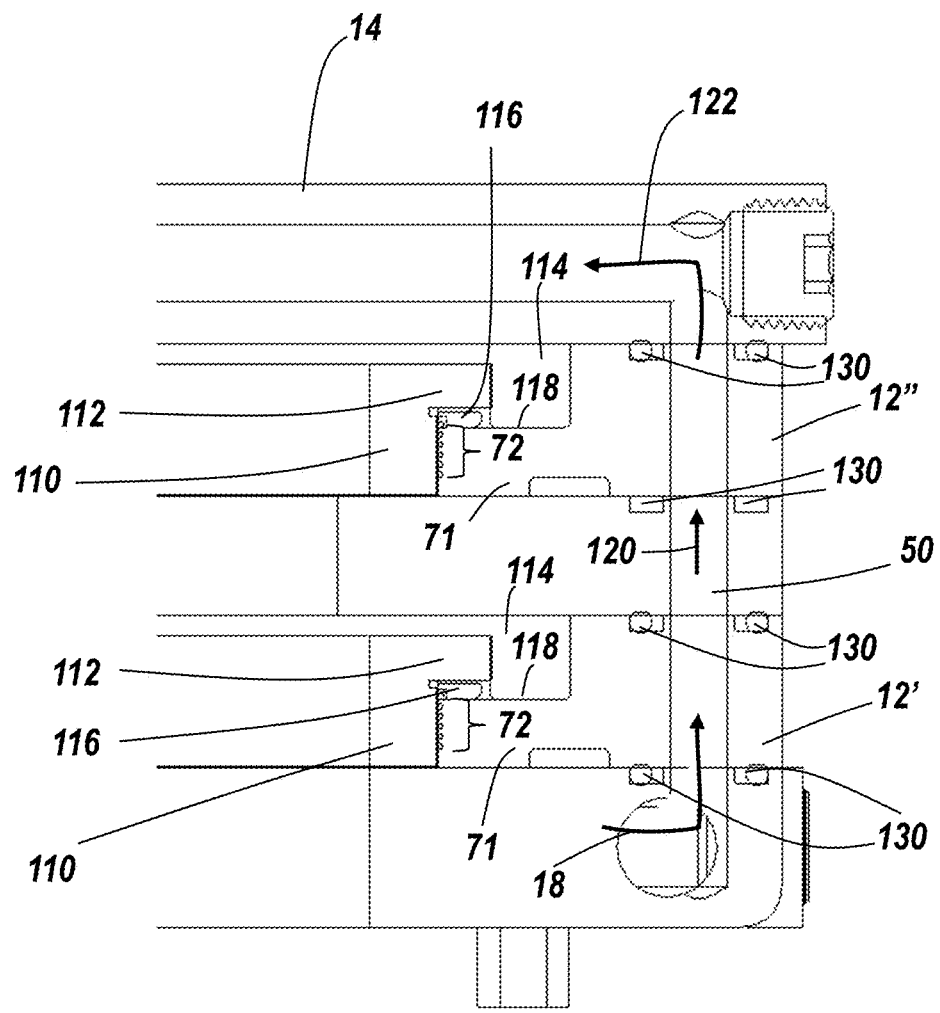
FIG. 12 is a diagrammatic illustration of the flow of coolant through the horizontal cross spool coolant channel of FIG. 11 and downwardly through the axial coolant channel and the manifold and through the spreaders, with the coolant exiting at the bottom of the bottom manifold, in accordance with the first exemplary embodiment of the present disclosure.

FIG. 12 is a diagrammatic illustration of the flow of coolant through the horizontal cross spool coolant channel of FIG. 11 and downwardly through the axial coolant channel and the manifold and through the spreaders, with the coolant exiting at the bottom of the bottom manifold, in accordance with the first exemplary embodiment of the present disclosure. Relative to FIGS. 11-12, the alignment of the various portions of axial channels 50 throughout the elements of the stacked structure can be seen, with the O-rings 130 positioned between the various sections. Importantly, what can also be seen are the grooves 72 in each grooved hollow spool core, with the grooves machined into core 71 and communicating with retaining ring 110.

Figure 13:
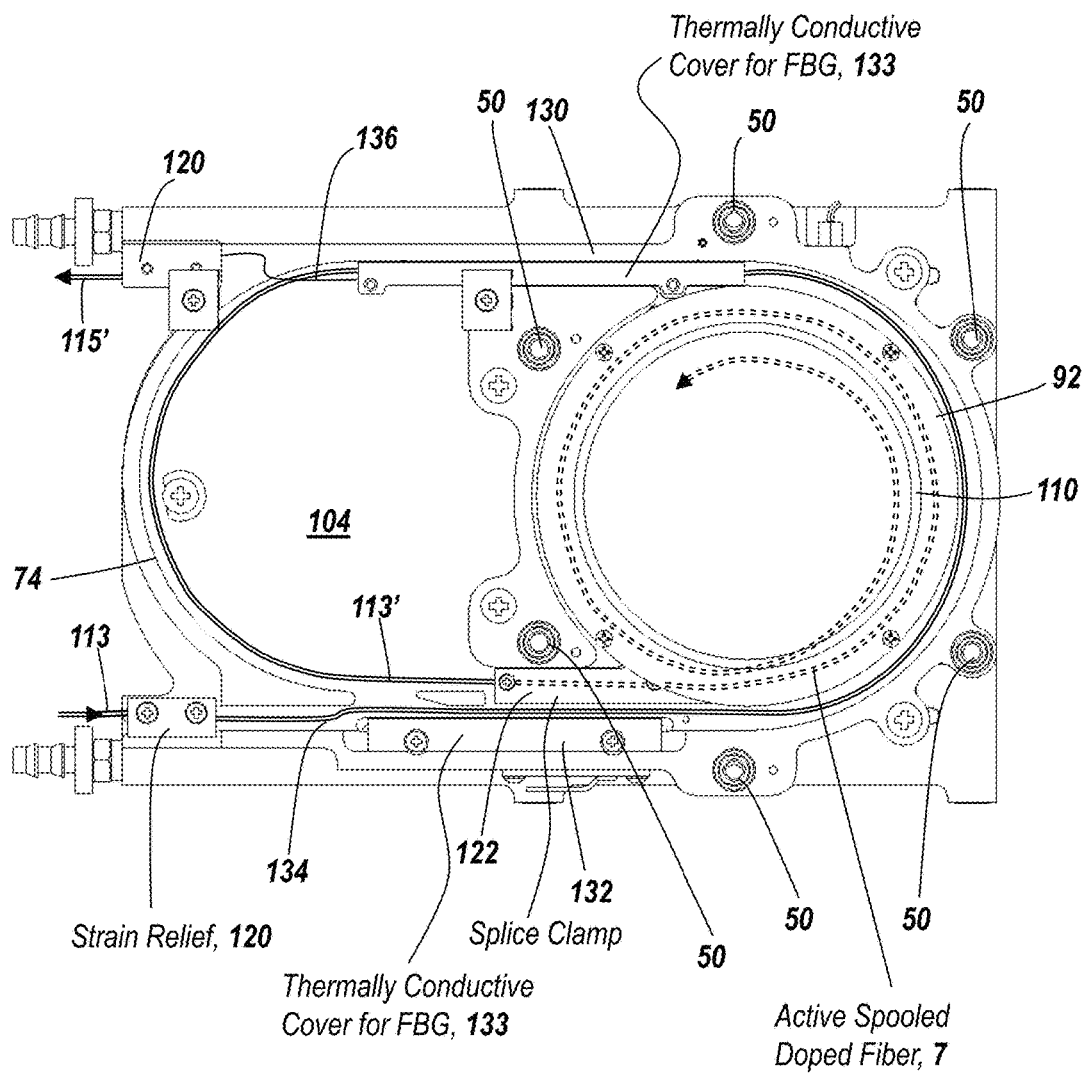
FIG. 13 is a top and cross-sectional view of one of the spool assemblies illustrating the routing of optical fiber within the spool body and the axial coolant channels disposed around a spool, in accordance with the first exemplary embodiment of the present disclosure.

FIG. 13 is a top and cross-sectional view of one of the spool assemblies illustrating the routing of optical fiber within the spool body and the axial coolant channels disposed around a spool, in accordance with the first exemplary embodiment of the present disclosure. As shown, the spool body 74 having retaining ring 110 is surrounded by circumferential channel 92, also showing axial coolant channels 50 positioned about the periphery of the spool, as illustrated. A flat support surface 104 is adjacent the spool on which the passive fibers are supported in a single plane to facilitate alignment of the passive fibers in the same plane as the proximal end of the active fibers, with no offsetting of the passive fiber at an angle to the active fiber. Using a single plane with no offsetting in the junction may give the fiber continuous mechanical support, thereby preventing damage during vibration or other stressing environments. Also shown in this figure are strain relief clamps 120 which, as will be described in FIG. 14, serve to securely anchor the passive fibers without pitching their cores. An elongated precision splice clamp 122 may provide thermal sinking to allow heat at the splice to reach coolant paths. The configuration of the splice assembling is also shown in FIG. 14.

It is noted that a heat sensitive component 130, generally a fiber Bragg grating, is packaged in a heat conductive or insulated package depending on the application and component sensitivity. The heat sensitive component 130 is the component whose temperature may be controlled via a heater or thermoelectric cooler powered by wires connected to this item. A heat generating fiber Bragg grating component 132 and cover 133 is designed to heat sink the underlying fiber Bragg grating and any thermal control modules utilized at this grating. It will be appreciated that a passive fiber optic cable 113' serves as a fiber optic input cable to the spooled fibers, whereas passive fiber optic cable 115' serves as an output cable running from the spooled fibers through precision strain relief clamps.

Figure 14:
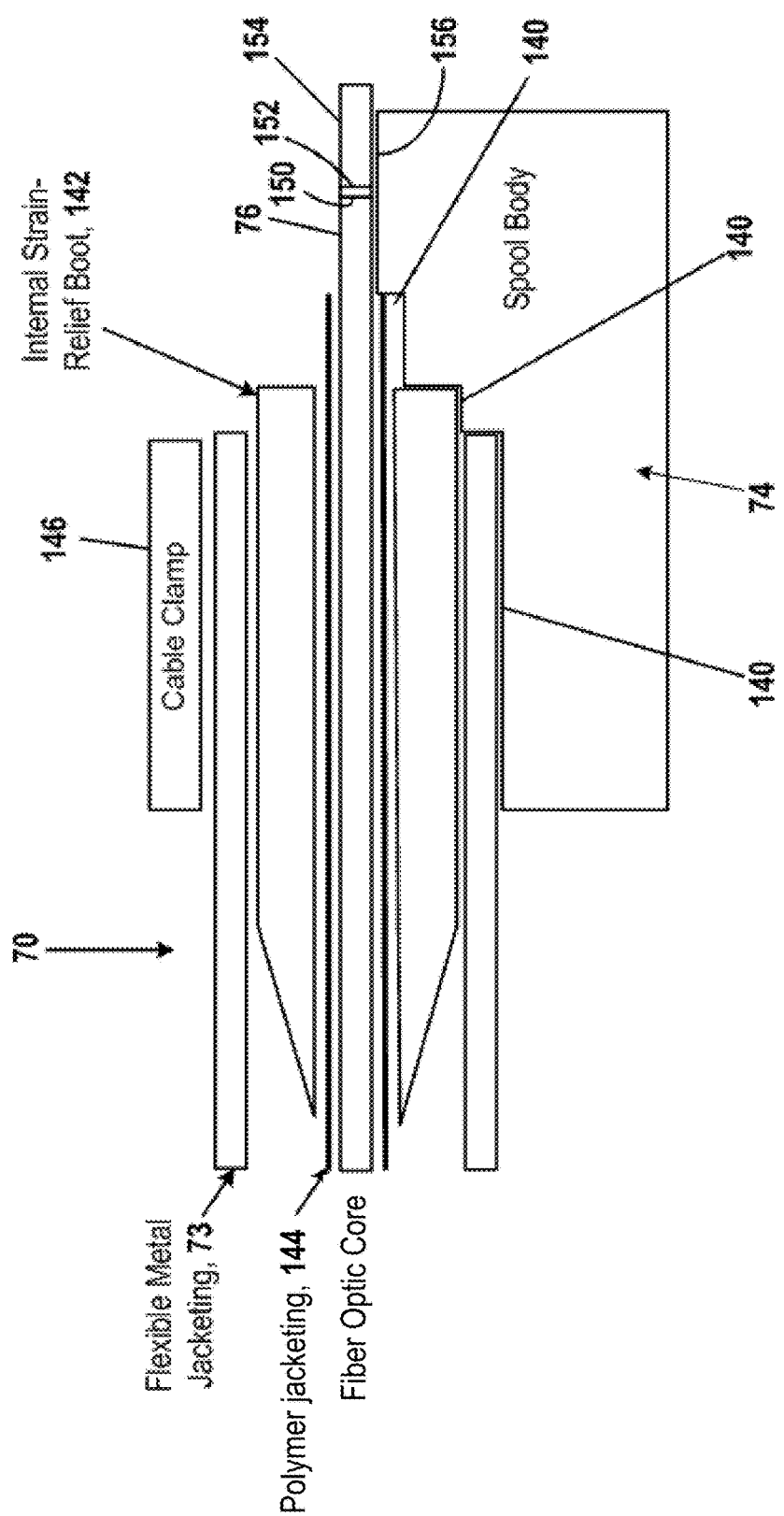
FIG. 14, is a diagrammatic illustration of the strain relief and clamping mechanism used within the spool structure of FIGS. 7-13 in which portions of optical fiber are housed in adjacent flat recesses in a precision splice clamp to secure the flexible metal jacket, internal strain relief boot, and polymer jacketing of the fiber optic cable as well as supporting the spliced fiber optic cores, thus to provide a robust connection structure for the optical fibers 3-D printing metal, in accordance with the first exemplary embodiment of the present disclosure; and, FIG. 15 is a diagrammatic illustration of an alternative cooling method in which circumferential cooling channels are provided around a spool core and adjacent heat generating components in which cooling channels are provided through the spool body utilizing 3-D printing techniques including direct metal laser centering or DMLS, in accordance with a second exemplary embodiment of the present disclosure.

FIG. 14, is a diagrammatic illustration of the strain relief and clamping mechanism used within the spool structure of FIGS. 7-13 in which portions of optical fiber are housed in adjacent flat recesses in a precision splice clamp to secure the flexible metal jacket, internal strain relief boot, and polymer jacketing of the fiber optic cable as well as supporting the spliced fiber optic cores, thus to provide a robust connection structure for the optical fibers 3-D printing metal, in accordance with the first exemplary embodiment of the present disclosure. In one embodiment, the abovementioned precision strain relief or splice clamp includes a number of recessed flats 140 which are staggered to accommodate fiber optic cladding 73 in the form of flexible metal jacketing, an internal strain relief boot 142 used within the optical cable, polymer jacketing 144, and fiber optic core 76. This structure is clamped to spool body 74 via a clamp 146 that clamps all of the components of the fiber optic cable to the spool body in a rigid fashion such that each of the fiber optic cable components is received in its own flat recess. This arrangement stabilizes the fiber optic cable to the spool body.

It will be appreciated that the structure serves to clamp an optical fiber to the spool body both in terms of providing a strain relief and also provides an assembly useful for fusion splicing of optical fiber cores. This clamping arrangement not only prevents undue pinching or stress on the optical fiber, but it also serves as an anchoring mechanism when two optical fibers are to be fused. As illustrated, optical fiber 76 may have an end 150 to be fused to an end 152 of another fiber 154. In order that there be no discontinuity in the fused area of both sections, the optical fiber must be held in exact alignment and this is accomplished at flat 156 in spool body 74. Rather than having an air gap which is often used in splicing passive fibers with active fibers, in this embodiment the assembly shown permits very accurate fusion splicing in which ends 150 and 152 are simultaneously heated until they fuse to each other.

Thus, the fixture provided by the assembly of FIG. 14 provides stability for splices as well as providing stable strain relief. What is also provided by this assembly is a robust connection between fiber optic cables either at the input or output to the spooled fiber optic cable, or to portions of the fiber optic cable within the spool casing.

Figure 15:
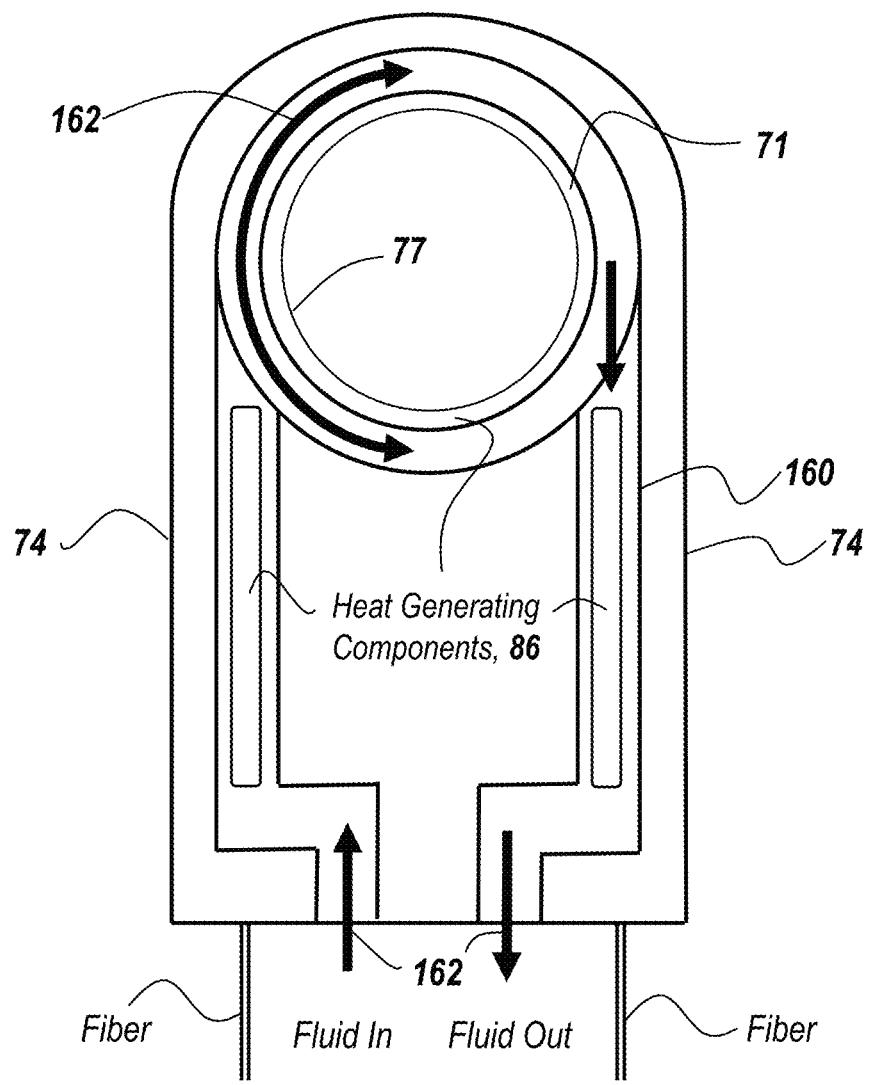

FIG. 15 is a diagrammatic illustration of an alternative cooling method in which circumferential cooling channels are provided around a spool core and adjacent heat generating components in which cooling channels are provided through the spool body utilizing 3-D printing techniques including direct metal laser centering or DMLS, in accordance with a second exemplary embodiment of the present disclosure. As shown in FIG. 15, rather than having the coolant flowing in axial channels, spool body 74 may be provided with internal channels 160 which run along the sides of the spool body and also circumferentially surround core 71. Here, the flow pattern is illustrated by arrows 162, with the internal channels in the spool body being formed in a direct metal laser sintering or DMLS 3-D printing operation that builds up the structure in layers. Internal to these layers are the aforementioned channels through which fluid can be moved. The use of the channels offers considerable flexibility in the way in which heat may be removed from the spool body the active fibers, and other components carried on the spool body.

It will be appreciated that the above structure enhances the survivability and reliability of fiber lasers in environments where large thermal perturbations and/or vibrations threaten consistent operation. The mechanical structure is designed specifically for the fiber laser to be enclosed, with design considerations such as, but not limited to, minimum bend radii, fiber diameters, heat loads and electrically controlled devices within the fiber laser.

The present invention is thus a spool and fiber routing structure designed to strategically encase a fiber laser to isolate it from environmental perturbations while providing simple mechanical, and optical interfaces. All core laser components are contained within the structure to increase environmental robustness. The entire structure is self-contained in construction with no splices or optical alignment required for installation or integration into a system, subsystem, or for use as a stand-alone unit. A fiber laser built using this type of packaging strategy can be plug-and-play with no significant skills required for integration and can be performed by a common layman or minimally trained technician.

Thermal coupling between spools is controlled by adding or removing interface material between spools. The addition of a thermal conductor will increase the thermal coupling, while the addition of a thermal insulator will reduce coupling. The absence of an interface material results in moderate thermal coupling. Specific applications will require different thermal coupling between spools. For example, an application requiring a stack of 50-100 spools where each spool is to operate at different power levels or wavelengths may require a high degree of thermal isolation between spools, whereas in an application with two spools of equal power, in a coolant flow-limited condition, it may be beneficial to take advantage of convection to the ambient environment, such that one may want to increase thermal coupling between spools.

The present invention allows varying degrees of interspool thermal coupling by removing the heat from the fiber laser before it reaches the mechanical interfaces between the spools. This decouples the heat transfer path from the physical interfaces comprising the spool stack-up hereinafter referred to as "thermal stacking". Thermal stacking is achieved using a cooling fluid that runs axially to the orientation of the lasers to be combined. The fluid may co-propagate or counter-propagate, or both, through conduits running through the spools, with these conduits formed by stacking several spools together. The fluid enters and exits the stacked-spool structure via manifolds in the top and bottom of the stack. This packaging architecture greatly reduces the physical resources required to thermally manage a significant number of spools because they can essentially share a common footprint within a laser package and share a common thermal fluid input or output. This architecture is not limited to fluid cooling but also lends itself to convective cooling using forced air. The integrated conduits promote short thermal paths while isolating the fiber laser from direct interaction with the thermal working fluid.

Thermal control of components within the spool is achieved via strategically building the fiber laser to share either common thermal interfaces or be isolated from internal heat loads to prevent thermal cross-talk. The fiber is placed in precision grooves of varying geometries to suit the specific fiber used to remove or add thermal energy to the particular fiber. These grooves are either directly machined into the spool structure or installed as subcomponents within the structure. Note, a single fiber laser may have one or more components that require either heating or cooling or both without exhibiting significant thermal cross-talk.

Mechanical isolation of the fiber is achieved by encapsulating the fiber in a type of conformal coating. The material used to conformal coat the fiber is specific to the application. This conformal coating prevents vibration from moving the fiber within the structure and abrading the outermost jacketing/coating/buffer on the fiber. The conformal coating also stiffens the fiber preventing any unsupported fiber from vibrating in fundamental modes that may become unstable and lead to fiber damage/breakage.

The present invention is most advantageous in applications within high-stress environments such as, but not limited to, military, oil and well-drilling, sub-marine, and on-board space-based environments where reliability is critical. Other applications like remote sensing, LIDAR/LADAR, welding and material processing, and fiber laser communications can benefit from the present invention. These are all environments requiring very high degrees of reliability, in part because servicing and/or replacement in the field are extremely costly or not an option. The present invention uses a highly-engineered structure to minimize or eliminate environmentally related laser failures.

This invention also provides an expedited time-to-market for a commercial laser manufacture. The present invention is designed such that one of common skill with minimal training may assemble the laser. The laser construction is modular and conducive to assembly line manufacturing. This is contrary to many high power lasers that are constructed by costly, highly educated engineers and physicists. Significant cost savings are realized via the assembly line style of construction. This is particularly important for applications that require many lasers such as in directed energy applications requiring >100 kW of optical power. For example, the subject invention permits fabrication of a 50% efficient, 100 kW laser built upon the combination of 100 W lasers and may require a total of 2,000 such lasers.

The stacked spool structure increases the space-efficiency of the laser with compact construction and with the flexibility of locating the laser spool "module" remotely from the pump source or exit aperture. The present invention uses an all-encompassing approach to isolate and compensate the laser for environmental perturbations to significantly increase laser reliability. The present invention is also unique because a complicated, high-power fiber laser may be installed or integrated in fielded applications by an unskilled technician or layman end-user.

Industrial research shows that vast majorities of fiber laser manufacturers use little to no internal reinforcement of the fiber and the fiber is often tangled in an unorganized fashion of tangled fiber interacting with each other lending to low degrees of reliability in a high stress environment. The present invention eliminates the tangling of fiber and the potential for failures to occur due to poor fiber management. Many fiber laser manufacturers also require a skilled technician for laser installation or integration in the field resulting in high costs and delays in schedule.

Typical lasers of powers >1 kW are not modular and cannot be remotely located from the exit aperture. This presents significant difficulties when attempting to put high-power lasers on aircraft where large volumes of space are rare, particularly near the skin of the aircraft. The present invention opens up high-power and very-high-power fiber lasers to space-restricted applications and platforms that were previously limited to low power lasers.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A fiber optic laser comprising:
a hollow spool structure housing a fiber in a spiral groove in an interior surface of said hollow spool structure, wherein the fiber is mechanically supported along an entirety of its length within the hollow spool structure; and
fluid channels formed within the hollow spool structure, wherein a quantity of coolant is movable through the fluid channels to provide high-precision thermal management of the fiber,
wherein said hollow spool structure includes an integral flat surface adapted to carry a passive optical fiber and for routing said passive optical fiber around a spool core and back to the spool core at a proximal end of an active doped fiber, wherein a plane at which the passive optical fiber meets the proximal end is tangential to a plane of the active doped fiber at the proximal end.

2. The fiber optic laser of claim 1, wherein the hollow spool structure has an axis and wherein the fluid channels are positioned axially with respect to the axis of the spool.

3. The fiber optic laser claim 2, wherein the fluid channels surround an apertured core of the hollow spool structure.

4. The fiber optic laser of claim 1, further comprising a plurality of hollow spool structures, each having fluid channels therein, wherein the plurality of hollow spool structures are stacked one on top of the other.

5. The fiber optic laser of claim 4, wherein the fluid channels in each of the hollow spool structures are aligned, wherein the fluid channels in each of the hollow spool structure are axially aligned.

6. The fiber optic laser of claim 5, further comprising gasket structures positioned between the stack of the plurality of hollow spool structures, wherein a seal is created between each of the plurality of hollow spool structures.

7. The fiber optic laser of claim 4, further comprising a thermal insulating material positioned between each of the hollow spool structures.

8. The fiber optic laser of claim 1, wherein the passive optical fiber is clamped at a strain relief assembly to the hollow spool structure on the plane both at an input and an output of the hollow spool structure.

9. The fiber optic laser of claim 8, wherein the strain relief assembly includes staggered flat recesses positioned to accommodate portions of the passive optical fiber.

10. The fiber optic laser of claim 9, wherein the portions of the passive optical fiber include: flexible metal jacketing, an internal strain relief boot, polymer jacketing, and an optical fiber core.

11. The fiber optic laser of claim 1, further comprising a passive fiber adapted to be coupled to an active doped fiber at a splice, wherein the splice includes staggered flat recesses to accommodate portions of the active and passive optical fibers, wherein ends of fibers to be spliced are in axial alignment with one another.

12. The fiber optic laser of claim 1, further comprising an encapsulant encapsulating the fiber in the grooves.

13. The fiber optic laser of claim 12, wherein said encapsulant includes thermally conductive material.

14. A fiber optic laser assembly comprising:
- a plurality of stacked spool lasers, each of the stacked spools having a hollow spool core;
- a grooved spiral structure formed on an inner surface of the hollow spool core of each of the plurality of stacked spool lasers;
- an active doped fiber positioned at least partially within the grooved structure, wherein the active doped fiber is continuously supported within the fiber optic laser assembly; and
- cooling channels running through the plurality of stacked spool lasers, wherein the cooling channels carry heat away from the active doped fiber in the grooved spiral structure; wherein the cooling channels run axially through the plurality of stacked spool lasers, wherein the cooling channels are axially aligned with each other to provide an axial cooling channel up through each of the plurality of stacked spool lasers, wherein each of the stacked spool lasers has:
- a pair of fiber Bragg gratings at either end of the active doped fiber; and
- temperature control assemblies at each of the fiber Bragg gratings to control the temperature thereof.

15. The fiber optic laser assembly of claim 14, wherein control of the temperature of said fiber Bragg gratings and that of the active doped fiber controls the spectral output of each of the plurality of stacked spool lasers.

\* \* \* \* \*